United States Patent Office

3,408,418
Patented Oct. 29, 1968

3,408,418
METHOD OF PREPARING DIOLEFINS CONTAINING SIX CARBON ATOMS BY THE REACTION OF ETHYLENE WITH 1,3-BUTADIENE IN THE PRESENCE OF A CATALYST SYSTEM OF FERRIC CHLORIDE, A TERTIARY PHOSPHINE, AND A TRIALKYLALUMINUM
Masao Iwamoto and Sadao Yuguchi, Ohtsu-shi, Japan, assignors to Toyo Rayon Kabushiki Kaisha, Tokyo, Japan, a corporation of Japan
No Drawing. Filed Sept. 7, 1965, Ser. No. 485,533
Claims priority, application Japan, Sept. 11, 1964, 39/51,382
5 Claims. (Cl. 260—680)

ABSTRACT OF THE DISCLOSURE

A method for preparing diolefins containing six carbon atoms e.g., principally 3-methylpentadiene-1,4 and hexadiene-1,3 which comprises reacting ethylene with 1,3-butadiene in the presence of a three component catalyst consisting of (1) ferric chloride, (2) a tertiary phosphine, and (3) a trialkyl aluminum.

---

This invention relates to a method of preparing valuable diolefins containing 6 carbon atoms, particularly 3-methylpentadiene - 1,4 and also hexadiene - 1,3. More specifically, the invention relates to a method of preparing the foregoing diolefins by reacting ethylene with 1,3-butadiene in the presence of a new catalyst composition.

Methods of preparing 1,4-hexadiene by reacting ethylene with 1,3-butadiene in the presence of a certain catalyst have been known heretofore.

For example, the specification of U.S. Patent No. 3,152,195 discloses a method wherein rhodium chloride is used as a catalyst, while French Patent 1,388,305 discloses a method wherein a combination of a nickel-phosphorus complex and an organometallic compound is used as catalyst.

In the prior art methods using the foregoing catalysts, the principal product obtained in all cases was 1,4-hexadiene; no special consideration however was given to the other diolefins having 6 carbon atoms.

We found that when ethylene and 1,3-butadiene were reacted in the presence of a certain catalyst, and preferably under certain conditions, that diolefins of 6 carbons, which could not be obtained by the prior art methods, such as, for example, 3-methylpentadiene-1,4 could be synthesized.

Although 3-methylpentadiene-1,4 itself is not a new compound, it is not disclosed at all even in such literatures as, for example, the Dictionary of Organic Compounds (London: Eyre & Spottiswoode, 1953), and consequently it is a compound whose method of synthesis is not substantially known.

It is an object of the present invention to provide a method of preparing the group of diolefins of 6 carbon atoms which are difficult to obtain as a principal product by the prior art methods.

Another object of the invention is to provide a method of preparing, from ethylene and 1,3-butadiene, 3-methylpentadiene-1,4 as the principal product.

Other objects and advantages of the present invention will be apparent from the following description.

The foregoing objects are attained in accordance with the present invention by a method of preparing diolefins containing 6 carbon atoms which comprises reacting ethylene with 1,3-butadiene in the presence of a catalytic amount of a three-component catalyst consisting of (1) ferric chloride, (2) a tertiary phosphine and (3) a trialkylaluminum.

The new catalyst composition used in the present invention consists of (1) ferric chloride, (2) a tertiary phosphine and (3) a trialkylaluminum. Although the ferric chloride which is used as the first component of the catalyst may be the commercially available product, as obtained, it is preferred from the standpoint of the reproducibility of the reaction that it be one which has been purified by sublimation in a nitrogen atmosphere or in vacuo.

The tertiary phosphine, which is used as the second component of the catalyst, is a compound having the formula $R_3P$, where R is alkyl, aryl, alkaryl, aralkyl or allyl, which may be the same or different. Typical of these tertiary phosphines include trimethylphosphine, triethylphosphine, tributylphosphine, triphenylphosphine, tribenzylphosphine, dibenzylphenylphosphine, benzyldiphenylphosphine, allyldiphenylphosphine, and diethylphenylphosphine. In general, triphenylphosphine, triethylphosphine or tributylphosphine is preferred.

The trialkylaluminum, which is used as the third component of the catalyst, is an organoaluminum compound having an alkyl group of not more than 12 carbon atoms, and preferably not more than 4 carbon atoms. As such a trialkylaluminum, included are triethylaluminum, tri-n-propylaluminum, triisopropylaluminum, triisobutylaluminum, tri-n-amylaluminum, tri-n-octylaluminum and diethylpropylaluminum, particularly preferred being triethyl and triisobutylaluminum.

According to the present invention, the foregoing several catalyst components can be used within a broad quantitative range. Generally speaking, the mole ratio of the ferric chloride to the trialkylaluminum is preferably such that the ratio of Al/Fe is not less than 1:1. When this mole ratio is above 10:1, the proportion in which 1,3-hexadiene is formed tends to become great. When it is intended to obtain 3-methylpentadiene-1,4 as the principal product, this mole ratio is preferably within the range 1:1–10:1. On the other hand, the mole ratio of the ferric chloride to the tertiary phosphine is preferably such that the ratio of P/Fe is also not less than 0.1. For instance, in the case of triphenylphosphine, good results can be obtained even if the mole ratio P/Fe is on the order of 1.5.

According to the present invention, ethylene is reacted with 1,3-butadiene in the presence of a catalytic amount of the hereinbefore described three-component catalyst. The three-component catalyst is best added in an amount corresponding to 0.001–0.1 mol of the ferric chloride to each mol of the 1,3-butadiene.

When the 1,3-butadiene is liquified in the reaction system, the use of a solvent can be dispensed with, but for minimizing the reaction between the 1,3-butadiene and enhancing the yield of the intended $C_6$ diolefins, e.g., 3-methylpentadiene-1,4, the use of a suitable solvent is preferred.

Conveniently used as such as solvent are the hydrocarbons such as pentane, heptane, cyclohexane, benzene, toluene and xylene, and the halogenated hydrocarbons such as chlorobenzene, bromobenzene, methylene chloride, 1,2-dichloroethane and 1,3-dichloropropane. Further, when substances which are gaseous at room temperature, such as propane and butane, are used as the solvent, the separation of the solvent by distillation becomes much easier.

Ethylene, the other starting material of the present invention, is preferably fed in such a manner that the system is maintained at a high pressure of at least 8 kg. per square centimeter, and preferably at least 20 kg. per square centimeter. By maintaining the concentration of the butadiene in the liquid phase low while maintaining the concentration of the ethylene in the liquid phase high by raising the ethylene pressure, side reactions can be checked and hence the yield of the intended $C_6$ diolefins can be enhanced. In this case, since the proportion in the product of 3-methylpentadiene-1,4 increases with an increase in the ethylene pressure, it is preferred to raise the ethylene pressure still higher when it is intended to obtain 3-methylpentadiene-1,4.

The reaction of ethylene with 1,3-butadiene is conveniently carried out normally at a temperature ranging between 0° and 80° C. An elevated temperature higher than 80° C. is not desirable since the reaction between the 1,3-butadiene becomes active, and also when the product intended is 3-methylpentadiene-1,4, it is also undesirable because the proportion of 1,4-hexadiene formed as a by-product becomes excessive.

According to the present invention as described above, it is believed that the 3-methylpentadiene-1,4 is formed from ethylene and 1,3-butadiene via the following reaction course.

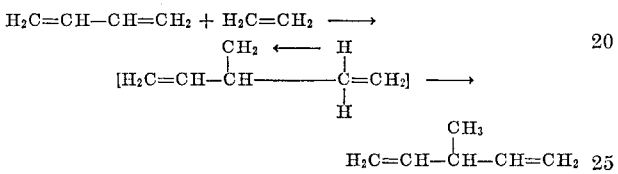

The so obtained 3-methylpentadiene-1,4 has a boiling point of 55° C.

According to the present invention, the diolefins of $C_6$ and above, especially 3-methylpentadiene, and also hexadiene-1,3, can be provided commercially. The so obtained 3-methylpentadiene-1,4 and hexadiene-1,3 are valuable as monomers for polymerization or copolymerization use, without further treatment, in such as the plastic, rubber, textile and adhesive fields. Further, since 3-methylpentadiene-1,4 has double bonds at both of its ends, it is valuable as an intermediate for compounds having functional groups at their two ends. For example, it can be used as a monomeric material for the preparation of polyamides and polyesters, i.e., as a diamine in the case of the former and as a diol in the case of the latter.

The following examples are presented to illustrate the present invention. It is however not intended to restrict the invention in any manner whatsoever by these examples.

EXAMPLE 1

An agitating type 200-cc. autoclave was charged with 60 cc. of toluene, 2 millimoles of anhydrous ferric chloride purified by sublimation and 3 millimoles of triphenyl phosphine. To this were then charged 20 cc. of liquified butadiene which had been measured in advance, after which 1 cc. of triethylaluminum taken with a syringe was added. The autoclave was closed and pressure was applied until the initial pressure of the ethylene inside the autoclave became 40 kg./cm.² at 50° C. When after carrying out the reaction for 3 hours at this temperature with stirring, the reaction liquid was distilled, 0.5 gram of a distillation residue remained to obtain a fraction consisting of five components. As a result of a gas chromatographic separation of these components, 9.1 grams of a $C_6$ diene component, 1.2 grams of 3-methylheptatriene-1,4,6 and 1.87 grams of n-octatriene-1,3,6 were obtained. It was confirmed from various tests that 33.7% by weight of the aforesaid 9.1 grams of $C_6$ diene component was 3-methylpentadiene-1,4.

EXAMPLE 2

When the reaction was carried out as described in Example 1 except that 4 millimoles of the triphenylphosphine were used, 2.3 grams of 3-methylpentadiene-1,4, 4.4 grams of hexadiene-1,3 and 2.5 grams of hexadiene-1,4 were obtained.

EXAMPLE 3

An agitating type 200-cc. autoclave was charged with 80 cc. of toluene, 2 millimoles of ferric chloride, 3 millimoles of triphenyl phosphine, 25 cc. of liquified butadiene and 8 millimoles of triethylaluminum. After closing the autoclave, ethylene was pressurized and the pressure of the system was adjusted to 100 kg./cm.² at 30° C., which was maintained for 16 hours at this temperature. After completion of the reaction, hardly any butadiene dimers were observable in the reaction product, $C_6$ dienes being the principal product. Of the 17.2 grams of the $C_6$ diene component, 8.6 grams were 3-methylpentadiene-1,4. 7.6 grams of the remainder were hexadiene-1,3, while the amount of hexadiene-1,4 was only 1 gram.

EXAMPLE 4

When the experiment was carried out as described in Example 1 except that 2 millimoles of tributyl phosphine were used instead of the triphenylphosphine, 1.2 grams of 3-methylpentadiene-1,4 were obtained.

We claim:
1. A method for preparing diolefins containing 6 carbon atoms which comprises reacting ethylene with 1,3-butadiene in the presence of a catalytic amount of a composition consisting of the three components of:
   (1) ferric chloride,
   (2) a tertiary phosphine of the formula:

$$R_3P$$

wherein R is monovalent hydrocarbon radical selected from the group consisting of alkyl, aryl, alkaryl, aralkyl and allyl groups, and
   (3) a trialkylaluminum.

2. The method according to claim 1 wherein the mole ratio of said component (1) to said component (3) is such that the ratio of Al/Fe is 1:1 to 10:1.

3. The method according to claim 1 wherein said reaction is effected at a temperature ranging between 0° and 80° C.

4. The method according to claim 1 wherein said reaction is effected under an ethylene pressure of at least 8 kilograms per square centimeter.

5. The method according to claim 1 wherein said tertiary phosphine is triphenyl phosphine.

References Cited

UNITED STATES PATENTS

| | | | |
|---|---|---|---|
| 3,219,716 | 11/1965 | Wittenberg et al. | 260—666 |
| 3,244,678 | 4/1966 | Tocker | 260—853 |
| 3,306,948 | 2/1967 | Kealy | 260—680 |
| 3,309,418 | 3/1967 | Hata | 260—680 |

PAUL M. COUGHLAN, JR., *Primary Examiner.*